May 8, 1945.   M. W. LA FEVER   2,375,666
CALCULATING DEVICE
Filed May 28, 1943   3 Sheets-Sheet 1
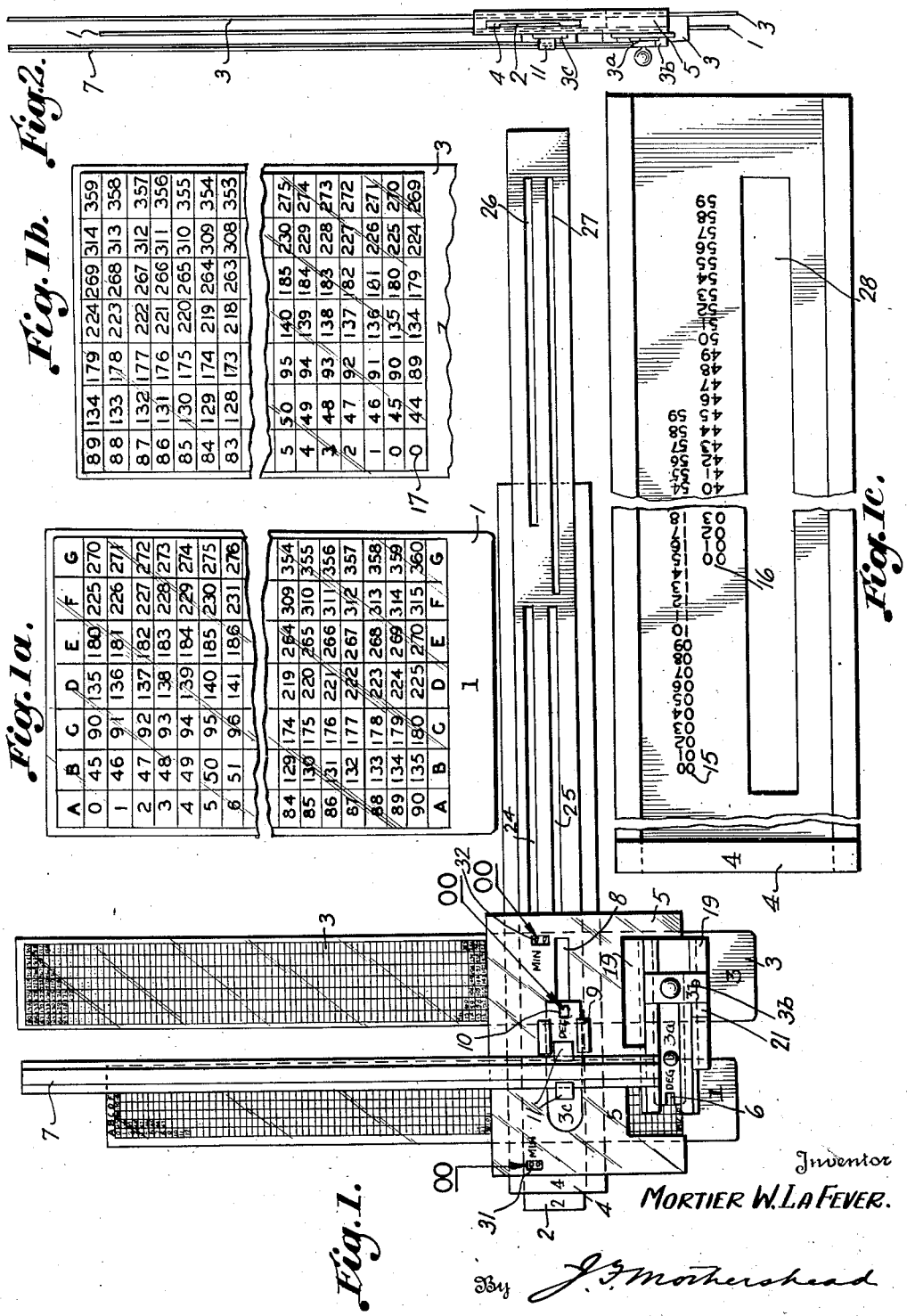
Inventor
MORTIER W. LA FEVER.
By J. T. Mothershead
Attorney May 8, 1945.   M. W. LA FEVER   2,375,666
CALCULATING DEVICE
Filed May 28, 1943   3 Sheets-Sheet 2
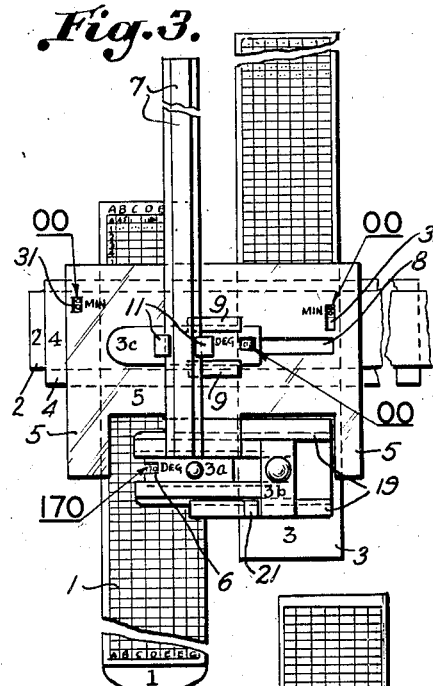
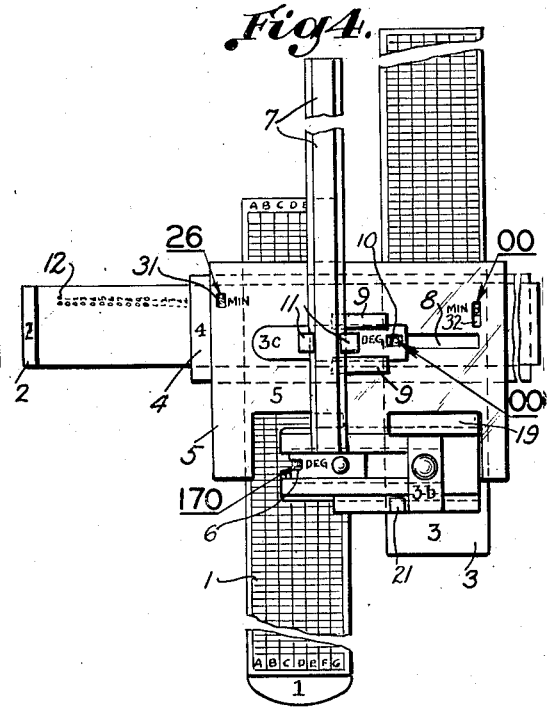
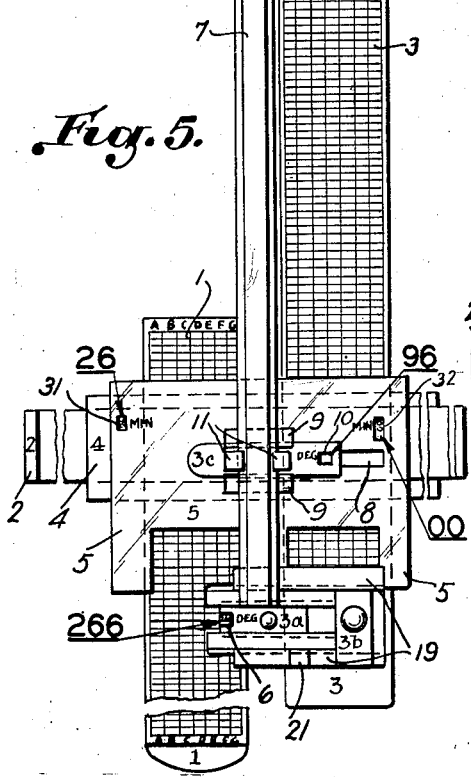
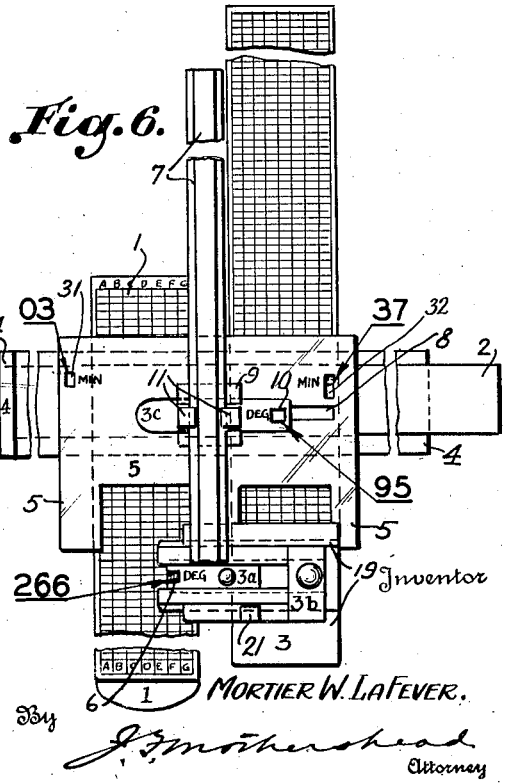
Inventor
MORTIER W. LaFEVER.
By J. Mothershead
Attorney May 8, 1945.  M. W. LA FEVER  2,375,666
CALCULATING DEVICE
Filed May 28, 1943   3 Sheets-Sheet 3
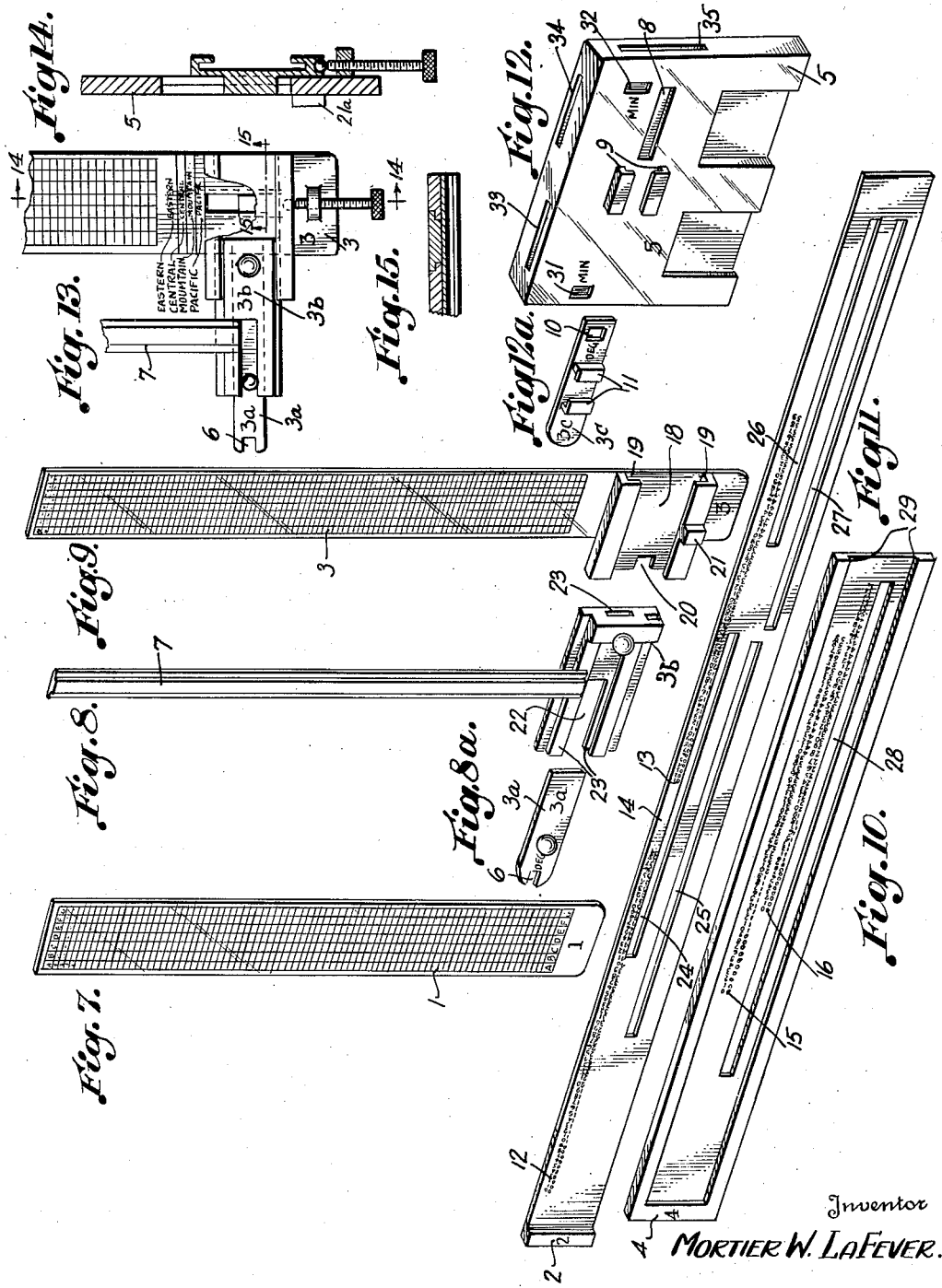
Inventor
MORTIER W. LAFEVER.
By J. F. Mothershead
Attorney

Patented May 8, 1945

2,375,666

UNITED STATES PATENT OFFICE 2,375,666

CALCULATING DEVICE

Mortier W. La Fever, Arlington County, Va.

Application May 28, 1943, Serial No. 488,834

5 Claims. (Cl. 235—89)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

The invention relates to improvements in calculating devices of the slide rule type, and has for its object the extension in the field of uses of a patented device issued under Letters Patent No. 2,228,274, by supplying additional means of determining, simply and accurately, with a direct reading, of differences between specified quantities. The improvements herein described are particularly suitable where scales of measurements are not expressed in geometric units and where a unit and a fractional unit are involved, particularly where the full cycle of the unit series of the desired scale consists of large numbers of units, as for example, one or more cycles of degrees and minutes in which 360 degrees constitute a cycle, or hours and minutes throughout a month, or hours and minutes through one week carried through any of the twenty-four time zones of the world with automatic correction for time zone differences, etc.

The object of my invention is to simplify the procedure necessary to determine the difference between two amounts otherwise confusing to handle, with either or both stated as a unit and a fraction, as for example, from 197° 27' in one cycle of degrees to 32° 11' in the next cycle. Simplicity of operation and the provision of windows or indicators in or at which appears the absolute difference between the quantities set on the scales, makes the device desirable for use in navigation, avigation, surveying, time problems involving time zones, engineering, banking, payroll work, and in many other fields of endeavor.

I have illustrated in the accompanying drawings a working device, as applied to degrees and minutes, having characteristics of my invention, and by which it may be practiced, wherein:

Fig. 1 is a top plan view of my device as described hereinafter.

Fig. 1a is enlarged detailed view of the arrangement of the scale of degrees on slide 1 with the central portion removed to enlarge the view.

Fig. 1b is an enlarged detailed view of the arrangement of the calibrated scale on slide 3 with the central portion removed to enlarge the view.

Fig. 1c is an enlarged detailed view of the arrangement of the minute scale on slide 4 with the central portion removed to enlarge the view.

Fig. 2 is a front elevational view.

Figs. 3, 4, 5 and 6 show the successive operational positions of slides numbered 1, 2, 3 and 4, respectively, in determining the number of degrees and minutes of difference between an example: 170° 26' and 266° and 03'.

Fig. 3, with slide 1 drawn to proper position and with the first column-selecting slide 3a positioned over the 170° in column D, indicates the first setting.

Fig. 4, with slide 2 drawn to proper position to show 26', indicates the second setting.

Fig. 5, with slide 3 drawn to proper position and with the master column-selecting slide 3b positioned over 266° in column F of slide 1, indicates the third setting.

Fig. 6, with slide 4 drawn to proper position to show 03', the last item constituting the problem, is the final operation and gives the absolute result 95° 37' in the right-hand windows or indicators of the device.

Figs. 7, 8, 8a, 9, 10, 11, 12 and 12a are exploded views showing the eight individual parts of the embodiment in perspective.

Fig. 7 is a top perspective of slide 1.

Fig. 8 is a top perspective of the master column-selecting slide 3b.

Fig. 8a is a top perspective of the first column-selecting slide 3a.

Fig. 9 is a top perspective of slide 3.

Fig. 10 is a top perspective of slide 4.

Fig. 11 is a top perspective of slide 2.

Fig. 12 is a top perspective of the chassis or block.

Fig. 12a is a top perspective of the finder slide 3c.

Fig. 13 is a top plan view of slide 3 showing a means for the automatic correction of time problems involving time zone differences, etc.

Fig. 14 is a longitudinal section taken on line 14—14 of Fig. 13.

Fig. 15 is a transverse section taken on line 15—15 of Fig. 13.

While the device is shown and described as applying principally to a 360-degree cycle other scales may be applied and the last three figures described hereinafter are presented to illustrate a method of making time zone corrections or for similar purposes.

In the drawings the adaptation shown to describe my improvements comprises slides 1, 2, 3, 3a, 3b, 3c and 4, and the chassis or block 5 (Fig. 12). The improvements over the device covered by my Patent No. 2,228,274 include changes in the principles involved in the construction of slides 1, 3 and 4, and the addition of column-selecting slides 3a and 3b, the finder slide 3c, and a means of adjustment, for time zone corrections or problems of similar nature, in the relative position of the window of slide 3b to the position of any given value carried in the columnar scale of slide 3.

Slide 1 is provided with a calibrated scale of

360°, constituting a cycle but arranged in seven equal columns lettered A, B, C, D, E, F and G (see Fig. 1a), with like spacing in each column and between columns. The columns are disposed lineally of the slide, and each covers 90 degrees, the first reading downward from 0 through 90, the second from 45 through 135, the third from 90 through 180, etc. The top 45 degrees of each successive column, after column A, overlaps the bottom 45 degrees of the previous column, in order that any beginning degree may always be located in the columnar series at a point above the ending degree.

Slide 3 is provided with seven columns of degrees similar to scale 1, but the first reading downward from 89 through 0 with an extra 0 (see 17, Fig. 1b), the second reading downward from 134 through 44, the third from 179 through 89, etc.

The front of slide 3 is provided with a mounting 18 (see Fig. 9) including ways 19, a recess 20 and a stop 21 in which from right to left is nested a master column-selecting slide 3b (see Fig. 8). Slide 3b in turn is provided with a rigid tongue 7, a recess 22 corresponding to recess 20 in the slide 3 mounting 18, and longitudinally with ways 23 to receive a slidably operable column-selecting slide 3a provided with a window 6 registering with recesses 22 and 20 through which selected calibrations on the scale of slide 1 may be visualized. The rigid tongue 7 projects through ways 11 provided on a slide 3c (see Fig. 12a) provided with a window 10. By this arrangement slide 3c will be given the same horizontal motion which may be utilized in any necessary movement of slide 3b from one columnar setting to another. The window 10 of slide 3c is of a width which corresponds to the width of one column on slide 3, and of a length which corresponds to the width of the elongated window 8 in the block or chassis 5 to be described hereinafter.

Horizontal slides 2 and 4 carry minute scales, as distinguished from scales of degrees with which slides 1 and 3 are provided. In other words, the fractional units of each of the scales of slides 2 and 4 equal one unit of the scales of slides 1 and 3. In the embodiment shown, slide 2 is provided with two calibrated minute scales 12 and 13 disposed in a single lineal line (see Fig. 11), each reading left to right 00 through 59, but with a gap 14, explained hereinafter, between the two series. Slide 4 is provided with two 00 through 59 minute scales 15 and 16 (see Fig. 10) disposed parallel to each other but with one lineally advanced with respect to the other, for purposes explained hereinafter, a distance corresponding in length to that of the gap 14 on slide 2.

Slide 2 is also provided with two offset pairs of lineally disposed parallel openings 24—25 and 26—27 with a dividing portion of the slide providing a gap between the offset pairs of openings. The gap between openings 24 and 26 corresponds in length to the gap 14 in the scales of slide 2, whereas the gap between openings 25 and 27 is reduced from the length of the gap 14 by an amount corresponding to the width of the columnar structure of slide 3. Openings 24 and 26 are so positioned or offset as to make the side by side minute scales 15 and 16, respectively on slide 4 visible therethrough. The other openings 25 and 27 are each of a width corresponding to the height of one horizontal series contained in the columnar scale structure of slide 3. These openings 25 and 27 are offset sufficiently as to successively expose or make visible the degrees of two successive horizontal series of the scale of slide 3. In other words, openings 25 and 27 are offset sufficiently to indicate a drop of one calibration, or one degree, on the scale of slide 3 when slide 2 is moved sufficiently to cause the gap between openings 25 and 27 to pass over the scale on slide 3, thereby bringing opening 27 into registry with a horizontal row of degrees next beneath the row exposed through opening 25 before the gap between those openings was moved across slide 3. The purpose of this offset is to diminish the measure of degrees by one in any case where the number of minutes in the beginning angle is greater than the number of minutes in the second or ending angle, as, for example, 170° 26' and 266° 03'.

Slide 4 is provided with an opening 28 of a width equal to the combined widths of openings 25 and 27 in slide 2 over which one or the other or parts of both of the latter are superimposed, and whereby figures of the calibrated scale on slide 3 may be visualized therethrough. Slide 4 is further provided with a channel or trough 29 open at both ends and in which slide 2 may be slidingly nested.

The chassis or block 5 is provided, as shown in Fig. 12, with openings 33 and 34 laterally therethrough but on different planes for carrying slides 1 and 3 and is also provided with another opening 35 for carrying slides 2 and 4 in nested relation beneath and transversely of slide 1 and above and transversely of slide 3. The block 5 is also provided with an elongated window 8 of sufficient dimension to reveal all scale readings in two contiguous horizontal series contained in the columnar scale structure of slide 3 when carried in openings 34. The block 5 is further provided with windows 31 and 32 for exposing single calibrations on the scales of slides 2 and 4 respectively when carried in opening 35. The block is still further provided with ways 9 which guide slide 3c, causing only the horizontal movements to correspond to those of slide 3b. Slide 3c is provided with a finder window 10 which exposes the proper answer, on slide 3 through opening 8, in accordance with the setting of slide 3b. Slide 3c is also provided with ways 11 in which tongue 7 of slide 3b is slidable and by which the longitudinal movement of slide 3c is controlled by the longitudinal movement of slide 3b.

Window 6 of slide 3a is appropriately marked "Deg." for the successive setting and reading of the degrees or whole numbers of the minuend and subtrahend of a given problem on the scale of slide 1. Similarly, window 31 of block 5 is appropriately marked "Min." for the successive setting and reading of the minutes or fractional numbers of the minuend and subtrahend of a given problem on the scales of slide 2. On the other hand, window 10 of slide 3c is appropriately marked "Deg." for the reading of the degrees or whole numbers of the answer or result on the scale of slide 3. Similarily, window 32 of block 5 is appropriately marked "Min." for the reading of the minutes or fractional numbers of the answer or result on the scale of slide 4.

For the purpose of clearly describing the actual workings of the device, reference is made to Figs. 3, 4, 5 and 6. Assuming a problem in surveying in which the angular difference between two lines is required, the first being 170° 26' from the point of beginning, and the second 266° 03', the first, second, third and fourth steps in operating the device are shown successively in the four figures mentioned. In setting the device at zero before setting the slides to show the desired difference in the specified readings, see Fig. 3, slides 2 and 4 are moved to the beginning position by moving them through the block to the right until their zero position is indicated in window 31; slide 3b is then moved to the left against stop 21 and by this movement of slide 3b, window 10 of slide 3c will be brought into registry with the first column of the scale of slide 3; slide 3a is next moved to the right in slide 3b as far as it will go so any full horizontal series of calibrated scales on slide 1 may be visualized through the coordinated openings 20 in slide 3, 22 in slide 3b, and 6 in slide 3a; slide 3 with its satellite slides 3b and 3a are then adjusted to the beginning positions by moving slide 3 upward until its zero position is indicated in window 10. In this position slide 3c coordinates with slide 3b and stands in the zero position with respect to the columnar structure of calibrated scales on slide 3. In bringing the slides to their zero positions just stated, slide 1 cannot be brought to a zero position nor is it essential to so position slide 1 since the settings of the other slides are not dependent upon an initial zero setting of slide 1.

After bringing all slides, except slide 1, to a zero setting, slide 1 is moved downward until the horizontal series of calibrated scales having 170, in the upper half of the calibrations, is in line with the common opening formed by 20, 22, and 6, above mentioned. Slide 3a is then adjusted to the left to outline through its opening 6 the beginning figure "170" which happens to be in column D (see Fig. 3). This is the first setting.

It will be noted that the succeeding second, third, and fourth settings are respectively with slides 2, 3 and 4, in the order of the items constituting the problem, i. e., first setting 170°, second setting 26′, third setting 266°, and fourth setting 03′.

The second setting, shown in Fig. 4, is identical with that of Fig. 3 in all respects except that slide 2 has been moved independently of slide 4, to the left sufficiently to permit "26" of the first calibrated scale 12 to be revealed through the setting window 31 by the first and second settings given the mixed number substrahend of 170° 26′ is now set upon the device.

For the third setting, shown in Fig. 5, the setting of slides 1 and 2 are retained as shown in Figs. 3 and 4 and slide 3b has been moved to the right, carrying slide 3a with it, sufficiently to bring opening 6 of slide 3a over the column, which happens to be column F, of slide 1 containing the calibrated scale 266 somewhere below the horizontal series in which 170 was found, then slide 3 carrying slides 3b and 3a with it has been moved sufficiently downward to outline the figure "266" in column F of slide 1 in the selecting window 6 of slide 3a. The simultaneous movement of the slides 3b and 3a two columns to the right for the purpose of selecting the column in which 266 occurs results in the coordinated movement of slide 3c and its "finder" window 10 two columns to the right on slide 3; the movement of slide 3 downward to cause the window 6 in slide 3a to outline 266 in column F of slide 1 while slide 3c remains stationary causes a reading of 96° in the third column of slide 3 to be revealed through finder window 10 equivalent to the difference in the 170° and 266° over which the window 6 of slide 3a has been set. At this setting the mixed number substrahend has been set; the whole number of the mixed number subtrahend has been set; and the difference between the whole numbers of the minuend and subtrahend is indicated in window 10 of slide 3c upon the scale of slide 3.

At this point the settings indicate the difference between 170° 26′ and 266° 26′, but the problem posed was that of the difference between 170° 26′ and 266° 03′. The last figure of the problem, 03, thus remains to be set. Slide 4 is used for this purpose, and when, as in this instance, the minutes of the last quantity are less than the minutes of the first quantity it is necessary, in order to reveal the proper item to move slide 4 (carrying slide 2 with it in the relationship fixed by the second setting) sufficiently to the left as to bring the figure 03 in the second series 13 of calibrated scales on slide 2 into registry with window 31. In so doing the slot 25 of slide 2 passes to the left beyond window 10 of slide 3c, and slot 27 of slide 2 is brought into registry with window 10 of slide 3c and since slot 28 of slide 4 is already in registry therewith individual calibrations of slide 3 are visible through window 10 and slots 27 and 28 of slides 2 and 4, respectively. The lineal offset in openings 25 and 27 of slide 2 thus cuts back the reading of degrees on the scale of slide 3, in finder window 10 from 96, as shown in Fig. 5, to 95, as shown in Fig. 6. At the same time, the movement of slide 2, by the movement of slide 4, from the position in which 26′ in the first calibrated scale 12 of slide 2 could be visualized through window 31 to the position in which 03′ in the second calibrated scale 13 of slide 2 could be correspondingly visualized, caused the opening 24 in slide 2, which registers with and exposes calibrations of scale 15 on slide 4 through window 32, to pass to the left of window 32, and the opening 26 in slide 2, which exposes scale 16 of slide 4, to be brought into conjunction with window 32. The distance of the relative movement modified by the offset in the two series of calibrated scales on slide 4 measures the difference between the 26 minutes of the first setting and the 03 minutes in the next cycle of minutes permitting the difference, 37 minutes, as shown in the second calibrated scale of slide 4, to be visualized through the conjunctivized openings 32, in block 5, and 26, in slide 2 (see Fig. 6). Thus in Fig. 6 is shown the absolute answer to the problem posed, the 95 of the scale of slide 3 being revealed through the conjunctivized openings 28 of slide 4, 27 of slide 2, 8 of block 5, and 10 of slide 3c, and 37′ of scale 16 of slide 4 through the conjunctivized openings 26 of slide 2 and 32 of block 5. This completes the solution of the problem and by setting the slides back to their zero or beginning positions the device is ready for the next problem.

Figures 13, 14 and 15 are shown for the purpose of showing a means to solve a problem where the reading of the unit item may be affected by a second variable. For example, the device adapted to the consideration of time, in hours and minutes, automatically reduces the reading by one hour when the number of minutes in the minuend is less than the number of minutes in the subtrahend. However, should a second factor be involved, such as the variation in standards—as the one-hour difference between time zones, then by providing a means of adjustment, so calibrated, as to vary the horizontal relation of the openings 6 in slide 3a to the horizontal series of calibrated scales on slide 3, an amount equal to the difference in such standards in terms of the calibrated vertical distances on slide 3, one may set the mounting carrying slide 3b at the beginning standard, as, for example, "Eastern time," and the final setting in terms of the ending quantity, as, for example, "Pacific time," and the difference recorded by the device will then show the difference in the clock readings properly modified for the changes in the time zones. This feature can be applied to any problem where a difference in standards as between the beginning quantity and ending quantity must also be allowed for. To bring about these results mounting 18 is adjustably mounted upon slide 3 in a manner whereby it may be moved upward and downward, by suitable means such as the positioning screw shown in Figs. 13 and 14, to and from positions for functioning in connection with time zones involved in a problem. Reference 21a indicates a stop carried with the movable mounting 18 for engagement with block 5 when bringing slide 3 and its associated slides to zero position.

It is to be understood that although my device is herein described with scales, slots and parts in a definite relation on straight slides, discs may be utilized. Discs, however, have the effect of reducing the fields to which the device may be adapted. It is to be further understood that minor changes in construction may be necessary, but within the scope of my invention, to apply the principles to different scales of measure.

It should be understood that the present disclosure is for the purpose of illustration only, and that the invention includes all modifications and equivalents which fall within the scope of the appended changes.

What I claim is:

1. A calculating device of the slide-rule type comprising a slide bearing a plurality of columns of numbers, a companion slide bearing an equal number of columns of numbers arranged in reverse order to the numbers of said first slide, a column-selecting slide carried by said second slide provided with a pointer to selectively indicate one of a row of numerals on said first slide, a second column-selecting slide adapted to selectively indicate one of a transverse row of numbers on said second slide, and means for moving said column-selecting slides in unison.

2. A calculating device of the slide rule type, comprising a slide bearing consecutive numbers arranged in a succession of columns, a companion slide bearing consecutive numbers arranged in an equal number of columns corresponding to those of the first slide, the numbers being arranged in the reverse order from those on said first slide, a transversely movable column selecting slide mounted on said second slide provided with a telescoping pointer adapted to selectively indicate one number of a transverse row of numbers of said first slide, a companion column-selecting slide adapted to selectively indicate a number on said second slide, means carried by said first selecting slide for moving said second selecting slide, and a second pair of numeral-bearing slides mounted transversely of said first pair, one slide of said second pair being superimposed upon and telescopically retained by the companion slide, said superimposed slide being provided with a plurality of longitudinal slots through one of which a scale on the retaining slide may be viewed and through two other slots offset by the width of a row of numbers on said first two slides through one or the other of which a number on the second of the first pair of said slides may be viewed.

3. A calculating device of the slide-rule type, comprising a slide bearing consecutive numbers arranged in a succession of columns, a companion slide bearing consecutive numbers arranged in reverse order from those on said first slide and in an equal number of columns, a transversely-movable column selecting slide mounted on an extension of said second slide, a telescoping pointer carried by said slide, a companion column selecting slide provided with a window adapted to selectively indicate a number on said second slide, means extending from said first selecting slide for moving said second selecting slide in unison therewith, a second pair of nested slides mounted transversely of said first pair, the superimposed slide of said nested slides bearing two sets of numerically arranged numbers and provided with four longitudinally extending slots, each slot being longitudinally separated from a companion slot and offset therefrom a vertical distance equal to the spacing of two consecutive numbers in any given column of figures on said first two slides, and the supporting slide of said nested slides being provided with a longitudinal slot aligned with and of the combined width of two of the companion slots of said superimposed slide.

4. A calculating device of the slide rule type comprising a block provided with two parallel openings for guiding and supporting slides provided with scale spaced numbers, a third opening extending through said block at right angles to said parallel openings and offset therewith and two windows for revealing single numbers on said slides and an elongated window to reveal a row of numbers confined in said openings, guideways carried by said block parallel with said third slide opening and on opposite sides of said elongated window, a slide bearing a plurality of columns of numbers mounted in one of said parallel slide openings, a second slide bearing a plurality of columns of numbers arranged in reverse numerical order to those of said first slide and provided with transverse integral ways, a column-selecting slide mounted in said latter ways provided with a rigidly attached tongue extending in a plane parallel with said parallel openings in said block, a second column selecting slide mounted in said first slide, a third column selecting slide mounted in said guideways of said block and provided with ways for said tongue and a window, a slide mounted in the third opening of said block provided with numerals opposite one window of said block and with one longitudinally extending slot for exposing numerals on said second slide, a fourth slide also provided with numerals aligned with a second of said windows superimposed upon and slidably mounted within said third slide and provided with four elongated slots for exposing numerals on said third slide as well as transverse lines of numerals on said second slide bearing a plurality of columns of numerals.

5. A calculating device of the slide rule type as defined in claim 2, characterized by having ways mounted on said second slide provided with means for at will varying the distance between said ways and the rows of numbers on said second slide.

MORTIER W. LA FEVER.